United States Patent [19]
Toillon et al.

[11] Patent Number: 5,954,810
[45] Date of Patent: Sep. 21, 1999

[54] DEVICE FOR COMMUNICATION BETWEEN A PLURALITY OF FUNCTIONAL MODULES INSTALLED IN A LOCAL UNIT AND AN ETHERNET TYPE EXTERNAL BUS

[75] Inventors: Patrice Toillon, Le Pecq; Gérard Colas, Versailles; Thierry Grand, Boulogne Billancourt, all of France

[73] Assignee: Sextant Avionique, Velizy Villacoublay, France

[21] Appl. No.: 08/870,000

[22] Filed: Jun. 5, 1997

[30] Foreign Application Priority Data

Jun. 7, 1996 [FR]  France ................................... 96 07081

[51] Int. Cl.⁶ ..................................................... G06F 13/00
[52] U.S. Cl. ............................ 710/129; 709/250; 370/448
[58] Field of Search ..................................... 395/306, 309, 395/200.8, 200.83; 370/445, 448, 242; 710/126, 129; 709/250, 253

[56] References Cited

U.S. PATENT DOCUMENTS 4,138,726  2/1979  Girault et al. .
5,724,343  3/1998  Pain et al. ............................... 370/242

FOREIGN PATENT DOCUMENTS

660 568      6/1995  European Pat. Off. .
WO 83/03179  9/1983  WIPO .
WO 90/09710  8/1990  WIPO .

Primary Examiner—Glenn A. Auve
Attorney, Agent, or Firm—Oblon, Spivak, McClelland, Maier & Neustadt, P.C.

[57] ABSTRACT

To establish communications between a plurality of functional modules installed in a local unit and at least one Ethernet type external, multiplexed, multi-transmitter and multi-receiver bus enabling communications with other local units, the device according to the invention comprises as many internal buses as there are functional modules of the local unit, each internal bus being of the multiplexed, multi-transmitter and multi-receiver type, complying with the format of the information elements travelling through the external bus, said functional modules being coupled to the internal buses so that access to each internal bus is controlled by only one module; and at least one coupling module designed to provide for the transfer of information elements between the internal buses and the external bus.

23 Claims, 7 Drawing Sheets

DEVICE FOR COMMUNICATION BETWEEN A PLURALITY OF FUNCTIONAL MODULES INSTALLED IN A LOCAL UNIT AND AN ETHERNET TYPE EXTERNAL BUS

BACKGROUND OF THE INVENTION

1. Field of the Invention

The present invention relates to a device for communication between one or more external buses and a set of electronic modules installed in a local unit such as an electronic bay.

It can be applied especially but not exclusively to electronic devices or machines installed on board aircraft, these machines being interconnected by one or more buses known as external buses. Certain of these machines, especially computers, are integrated into racks, each rack assembling a set of modules interconnected by an internal bus called a <<backplane bus>>

2. Description of the Prior Art

Given that the number of interconnected electronic machines installed on board aircraft is on the increase, it is necessary to have available an interconnection means to reduce the number of physical links between machines while providing for an increasingly higher bit rate. At present, the trend is towards an approach that uses a multi-transmitter and multi-receiver, multiplexed bus as defined by the aeronautical standard ARINC 629.

The fact is that this standard implies complicated mechanisms of detection and tolerance to malfunctioning, given the critical nature of the information exchanged, for these mechanisms are made up of specific components that are distributed in small quantities and are therefore costly. This standard also implies insufficient bit rates (of 2 Mbits/s) when the operations to be carried out are maintenance operations such as, for example, remote software-loading operations.

There is also the known IEEE standard 802.3 implemented for example in Ethernet type local area networks designed for communications at higher bit rates (10 Mbits/s) between computers, not specifically for the field of aeronautics but for applications in data processing in general. The components used for these communications are therefore designed for increasingly wider distribution, have a higher level of integration and are more simple because communications of this type implement a simple protocol not subjected to constraints that are as severe in terms of detection and tolerance to malfunctioning It is therefore advantageous to apply this standard to communications between functional units connected to the external bus.

However, this standard has been designed for communications over distances ranging from some meters to some hundreds of meters and not for communications between modules at distances of some centimeters from one another in an electronic bay or rack.

Furthermore, this standard applies the CSMANCD principle (or principle of carrier sense mode access/collision detection) which consists in monitoring before transmitting, and transmitting only when the channel is free, the state of the channel being determined by the detection of the carrier. In the event of collision, i.e. when several transmitters start transmitting at the same time, each transmitter waits for a period with a random duration before making a new attempt at transmission.

Thus, from a certain frequency of transmission requests onwards, the number of collisions increases, leading to a collapse of the mean bit rate of the link.

It is also a fact that the requirements in terms of transmission bit rate between modules of one and the same rack are very great and may exceed the instantaneous capacity of a single link of the ARINC 629 or Ethernet type. The ARINC 659 standard has therefore been devised. This standard defines a redundant bus with a high bit rate (60 Mbits/s) that is also a multiplexed multi-transmitter and multi-receiver bus.

However, transmissions at such bit rates are very sensitive to electromagnetic disturbances and therefore require the use of costly technologies.

Furthermore, if different protocols are used on the external bus and the internal bus of a rack, the data formats and the respective bit rates of these buses are different. These buses are therefore asynchronous with respect to each other. The coupling modules providing for the interconnection between the external bus and the modules of the rack then inevitably introduce a delay time in the transmission of information elements, and must perform an operation for the manipulation of information elements that reduces the reliability of the entire communication system.

SUMMARY OF THE INVENTION

The present invention is aimed at overcoming these drawbacks. To this end, it proposes a device for communications between a plurality of functional modules installed in a local unit and at least one Ethernet type external, multiplexed, multi-transmitter and multi-receiver bus to communicate with other local units.

According to the invention, this device comprises:

- at least as many internal buses as there are functional modules of the local unit, each internal bus being of the multiplexed, multi-transmitter and multi-receiver type, complying with the format of the information elements travelling through the external bus, said functional modules being coupled to the internal buses so that access to each internal bus is controlled by only one module; and
- at least one coupling module designed to provide for the transfer of information elements between the internal buses and the external bus.

This approach offers several advantages. First of all, each functional module has available a multi-transmitter, multi-receiver bus of its own for the transmission and/or reception of information elements. The passband placed at the disposal of each module therefore corresponds to the total passband of the bus, namely 10 Mbits/s in the case of an Ethernet type bus. Since the internal buses are no longer multiplexed (i.e. they are used in non-shared mode), there is the benefit of total physical and electrical insulation between modules.

Furthermore, since each internal bus is controlled by only one module, any risk of collision within the local unit is averted. This makes it possible to simplify the transmission procedures.

This approach implements a simplified coupling module inasmuch as, firstly, the bit rate and format of the data elements used internally are similar to those of the external bus. No particular treatment therefore is needed to transfer the information elements flowing on the external bus into the local unit apart from a conversion of electrical level. Thus, this avoids the introduction of a delay time as well as information-handling operations that entail additional risks of malfunctioning.

Furthermore, since the internal buses use the same spatial protocol (frame format) as the external bus, the same devising and maintenance tools, such as the bus emulation and observation tools, may be used on the external buses and the internal buses.

According to a first preferred embodiment of the invention, each module of the local unit has at least one internal bus on which it is the sole transmitter, the other modules being simply receivers, an additional internal bus being assigned to each external bus for the distribution, from inside the local unit, of information elements travelling through the external bus, this distribution bus being of the same type as the internal buses, and being connected to the functional modules and to the coupling module.

Thus, each functional module is capable of receiving information elements simultaneously on several internal buses.

In order to prevent congestion at reception, each functional module comprises means to permit transmission only if all the internal buses of a predetermined group are free.

According to a second preferred embodiment of the invention, each internal bus of the local unit sets up a link between a respective module of the local unit and the coupling module.

BRIEF DESCRIPTION OF THE DRAWINGS

The preferred embodiments of the device according to the invention shall be described here below, by way of non-restrictive examples, with reference to the appended drawings, of which.

MORE DETAILED DESCRIPTION

Figure 1:
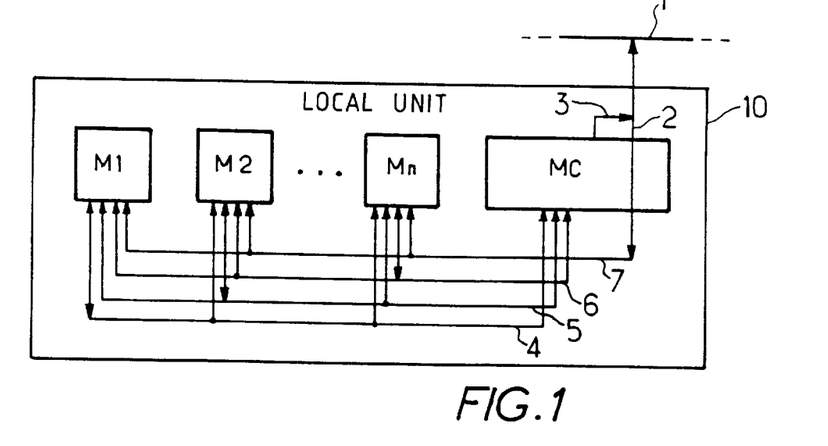
FIG. 1 gives a schematic view of the mode of interconnection between the functional modules of the local unit according to the first preferred embodiment of the invention.

FIG. 1 shows a local unit or rack 10 placed on board an aircraft connected to at least one external bus 1.

This local unit 10 has a plurality of functional modules M1, M2, . . . , Mn, and at least one coupling module MC plugged into a backplane so that these modules can be connected to a set of internal buses 4 to 7, the coupling module MC providing for the interconnection between the external bus 1 and the internal buses 4 to 7.

The local unit 10 has at least as many internal buses 4 to 6 as it has modules capable of transmitting messages intended for the other modules of the local unit 10 or a module located in another local unit connected to the external bus 1, and an additional bus 7 connected to the external bus 1 by a connection means 2 so that the messages travelling through the external bus are broadcast to the modules M1, M2, . . . , Mn of the local unit 10. Thus, each module M1 to Mn capable of transmitting messages has an available bus 4 to 6 on which it is the sole transmitter.

The external bus 1 as well as the internal buses 4 to 7 are multiplexed, multi-transmitter and multi-receiver buses and are managed with one and the same data format, the internal buses 4 to 7 being used in mono-transmitter mode.

In this way, the messages travelling through the external bus 1 are transmitted directly to the internal bus 7 without any processing, except for an electrical matching operation to take account of the difference in voltage level and in waveform between the external bus 1 and the internal bus 7.

In the architecture described here above, the reception capacity of each module is limited. It is therefore not possible to greatly increase the number of reception operations (following transmission operations) on the internal buses without risking congestion in the modules. To eliminate this drawback, it is planned to arrange the order of the transmissions of at least a part of the modules M1 to Mn on the basis of the monitoring of the activity of the different internal buses 4 to 6, the internal bus 7 that extends the external bus 1 in the local unit 10 remaining independent.

According to a first example, this arrangement may be obtained by the application, by analogy, of the principle of the CMSA/CD protocol used by Ethernet to all or a group of modules M1, M2, . . . , Mn and to their corresponding internal buses 4 to 6 of the local unit 10. Thus, in this example, a transmission of a functional module is permitted only if all the internal buses associated with the functional modules belonging to the group considered are free.

For this purpose, it is enough to carry out an AND logic operation of the "active bus" signal of all the internal buses of the group considered.

Similarly, it shall be assumed that there is a collision if two functional modules of the group considered decide to make transmission at the same time, the collision being then processed according to the Ethernet principle, by means of a wait for a period of random duration before another attempt at transmission.

In this way, the reception capacity of a module is made independent of the number of modules in the functional unit.

It must be noted that this architecture permits the redundancy of the modules. It is indeed possible to place two redundant transmitter modules on the same bus in a master/slave association, the slave module transmitting only when there is no transmission from the master module.

Figure 2:
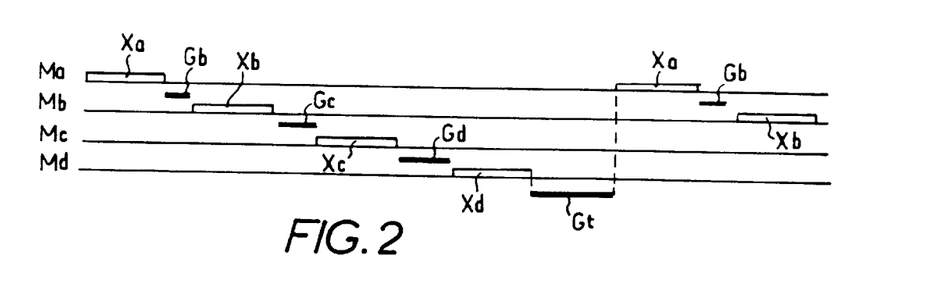
FIGS. 2 and 3 illustrate two examples of the organization of the transmission of messages on the internal buses.

To prevent simultaneous transmission on several internal buses of one and the same predetermined group, it is possible, by configuration as shown in FIG. 2, to assign a respective waiting time or "gap" Ga, Gb, Gc, Gd to each module Ma, Mb, Mc, Md of the group considered of the local unit, it being possible for a transmission Xa, Xb, Xc, Xd from a module to be made only if all the internal buses of the group considered are free during the waiting period Ga to Gd. Thus, if all the modules Ma to Md of the group considered are assigned different waiting times Ga to Gd, no simultaneous transmission can take place (in this example Ga=0).

To this end, each module has a time lag whose duration corresponds to the respective waiting times Ga to Gd. This time lag is activated as soon as all the internal buses considered are free and deactivated when a transmission is detected. If the time lag reaches its term before being deactivated, transmission is permitted.

To enable transmission to be made by the modules that have been assigned the longest waiting times, each module Ma to Md can transmit only once during a frame that ends in a waiting time Gt known to all the modules of the group considered. To this end, each module comprises a second time lag common to all the modules of the group. The duration of this second time lag corresponds to the waiting time Gd, and this second time lag is also activated solely during the periods when all the buses considered are free. When this time lag reaches its term without being deactivated, a new frame begins. This reactivates all the specific time lags of each module. The module Ma that is assigned the shortest waiting time Ga can then make a new transmission.

Figure 3:
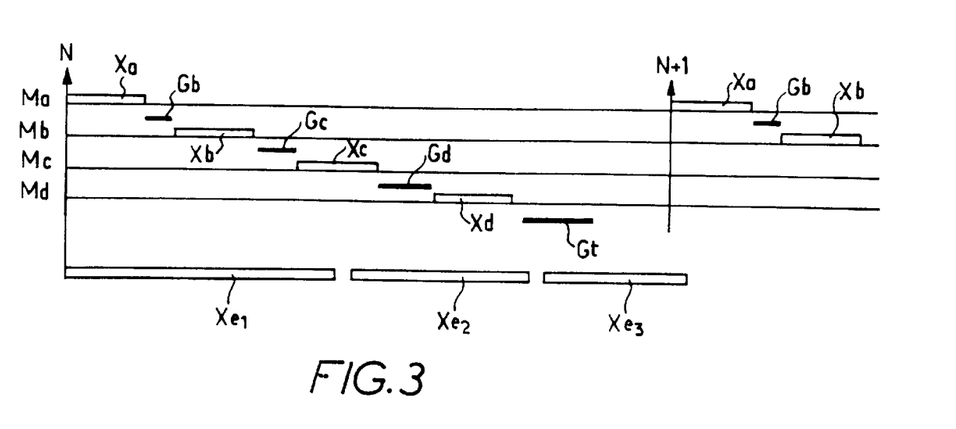

In a second example illustrated by FIG. 3, the transmissions Xa to Xd from the modules are organized in cyclical frames that bring together the transmissions of the modules of the functional unit. This periodicity is necessary in certain cases, when the data elements transmitted are used to obtain servo-control loops that bring into play derivatives as a function of time.

In this example, the cyclical frames are built in accordance with the principle of the ARINC 629 standard according to which each module Ma to Md is associated with a specific duration and is entitled to transmit only one message per cycle. Authorization to make transmission is determined by the monitoring of all the internal buses of the group of internal buses/modules considered, by the detection of the specific waiting time or "gap" Ga to Gd, associated with the module, during which all the buses of the group have remained free, as well as by the absence of transmission from the module during the cycle in progress. This absence of transmission is determined by the detection of a new cycle obtained by the detection of a duration Gt of inactivity of the internal buses of the group that is longer than all those associated with the modules, this duration marking the end of a frame, and by the detection of a cyclical beep N, N+1 corresponding to the start of a frame.

Achieving this principle of communications requires a third time lag per module. This third time lag has a duration corresponding to that of the cycle and is permanently activated, independently of the activity of the internal buses.

Depending on the complexity of the frames which may or may not contain different messages at each cycle with a recurrence, the composition of a message by a module is obtained or not obtained from a predefined transmission table XT.

Furthermore, for certain modules, for example input/output modules and insofar as the bit rate offered by the bus permits it, it is possible to envisage a case where all the data elements acquired are retransmitted in the form of a single message at each cycle of the internal bus, thus simplifying the making of the module.

In parallel with the transmissions made by the modules Ma to Md, the internal bus 7 has the messages Xe1, Xe2, Xe3 coming from the external bus 1. These messages are retransmitted asynchronously and non-cyclically in the local unit 10 to the modules.

Figure 4:
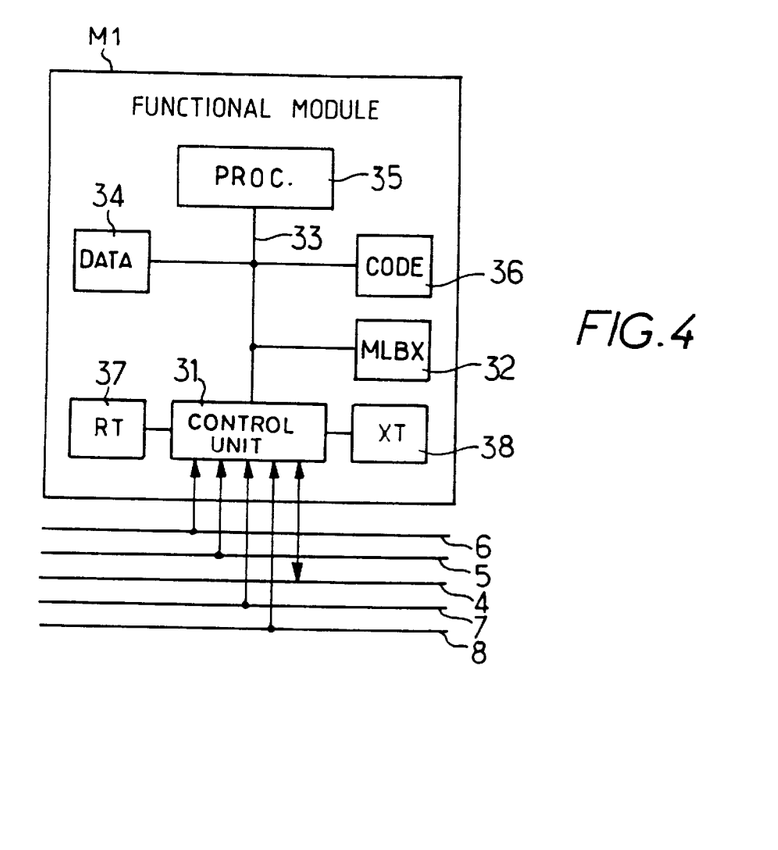
FIG. 4 gives a schematic view of the architecture of a functional module shown in FIG. 1.

FIG. 4 shows an exemplary internal structure of a functional module M1 that is a transmitter on the internal bus 4 and a receiver on the internal buses 5 to 8, the buses 7 and 8 being connected to two buses external to the local unit.

This module comprises a processor 35 connected by means of a processor bus 33 to a memory 36 containing the program to be performed, a working memory 34 as well as a control unit 31 for the control of the internal buses 4 to 8. This control unit 31 carries out the transmission and time lag functions indicated here above as well as the transfer of messages between the internal buses 4 to 8 and an exchange memory 32. This exchange memory 32 is also connected to the processor bus 33 and fulfils the role of a mailbox. This control unit 31 may be connected to two non-volatile memories 37, 38 used to store the characteristics respectively describing the information elements to be received and transmitted. These tables 37, 38 in particular indicate the storage address of the messages to be received or transmitted in an exchange memory 32. The access to the reception table 37 uses an identification code of the message (the address of the addressee for example) and an internal bus number 4 to 8 in the case of a message to be received, as well as other information elements for example on the type of data elements contained in the message.

By the static configuration of a table, the sub-system that processes the message is thus relieved of a certain number of tasks, especially that of the filtering of the information elements transmitted by the message.

Figure 5:
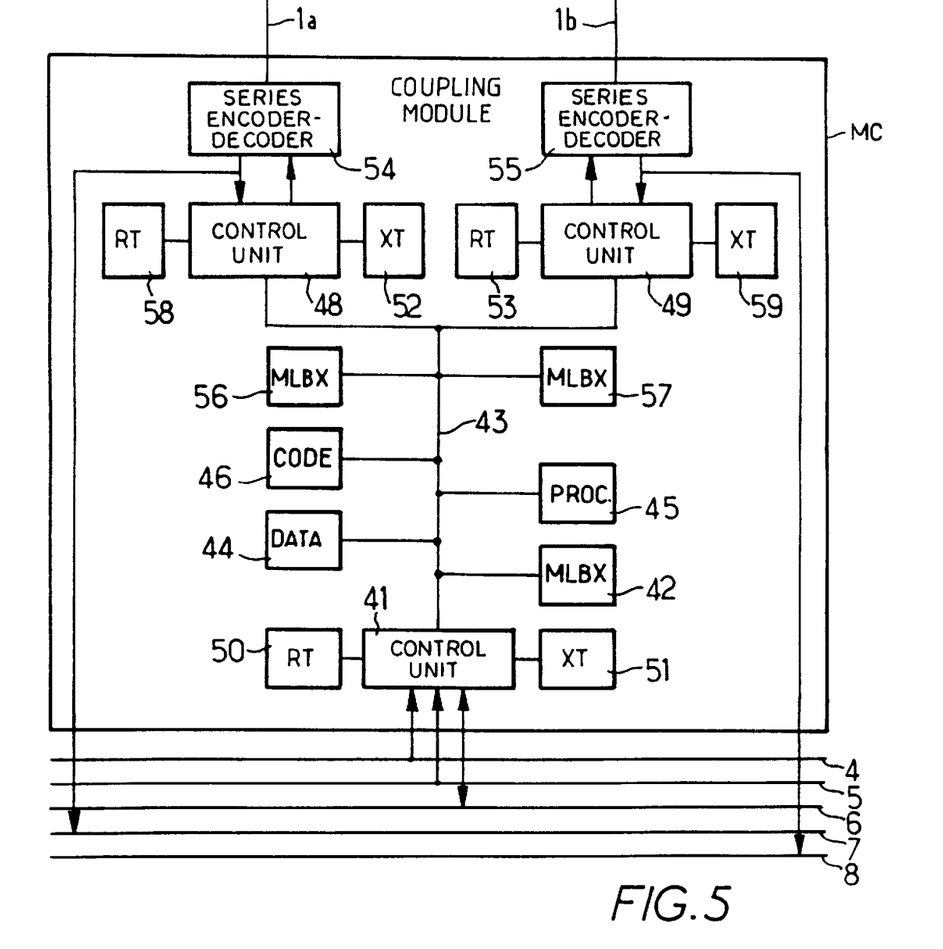
FIG. 5 gives a schematic view of the architecture of the coupling module shown in FIG. 1.

Similarly, FIG. 5 shows an exemplary internal architecture of a coupling module MC providing for the transfer of information elements between two external buses 1a, 1b and the internal buses 4 to 8. This module is connected to the internal buses 4 to 8 by means of a control unit 41 that is analogous to the control unit 31 of a functional module M1. This control unit provides for the transfer of messages between the internal buses 4 to 6 and an exchange memory 42, the bus 6 being assigned to the coupling module MC to enable the transmission of service and maintenance messages, for example intended for other modules of the local unit 10.

Like the control unit 31 of a functional module M1, the control unit 41 is connected to two non-volatile memories RT and XT, 50, 51 in which there are stored all the information elements respectively describing the messages to be received and transmitted.

The coupling module MC also comprises a processor 45 connected by means of a processor bus 43 to a memory 46 containing the program to be performed, a working memory 44 in which the data elements are stored and an exchange memory 42 to store the messages received or the messages to be transmitted on the internal buses 4 to 8.

For reasons of economy, the physical information formats adopted for the internal buses 4 to 8 are different from those of the external buses 1a and 1b, for the constraints of range of transmission on the internal buses 4 to 8 are far smaller than those imposed on the external buses 1a, 1b.

This is why the coupling module MC has two serial encoding/decoding circuits 54, 55 respectively connected to the two external buses 1a, 1b. These circuits 54, 55, in the direction of external reception (from the respective external bus 1a, 1b to the corresponding internal bus 7, 8) provide for the conversion of differential type physical information into TTL type logic information and, in the direction of transmission, provide for the reverse conversion.

The serial interface circuits 54, 55 also fulfil a condition of monitoring of physical information.

The coupling module MC also has two external bus control units 48, 49 that are similar to the control unit 41 but are single-channel units in reception, connected respectively to the serial interface circuits 54, 55 to provide for the transmission, on the external buses 1a, 1b, of messages that are in a respective exchange memory 56, 57. For this purpose, each of these two control units 48, 49 is connected to a respective non-volatile memory 52, 59 containing the description of the messages to be transmitted as well as a respective non-volatile memory 58, 53 containing the description of the messages to be received. The two exchange memories 56, 57 are connected to the processor 45 by means of the bus 43. The processor 45 carries out, for example, functions for the selection of redundant data elements coming from different backplane buses and carries out the requisite data transfers between the exchange memory 42 and the exchange memories 56, 57.

Figure 6:
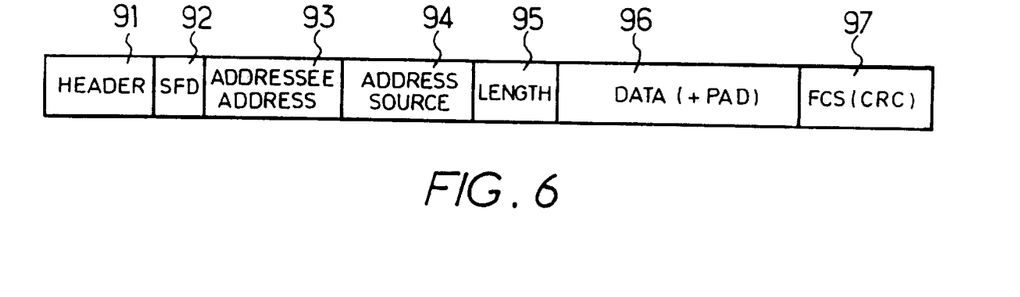
FIG. 6 shows the format of a frame according to the IEEE standard 802.3.

FIG. 6 illustrates the principle of construction of the messages according to the IEEE standard 802.3 travelling on the internal buses 4 to 8 as well as the external buses 1a, 1b. Each message contains a 56-bit header 91 followed by an eight-bit SFD field 92, these two fields having a predefined value indicating the beginning of a message. The next two fields 93, 94 are designed for the reception respectively of the address of the addressee and that of the sender of the message, each of these fields having a variable length of two to six bytes. The next field 95 gives the length of the message on two bytes while the field DATA 96 contains the data elements to be transmitted on 46 to 1500 bytes. The message ends with the FCS field 97 which indicates the end of the message and gives the value of the checksum of the message on four bytes, this message being for example of the cyclic redundancy check (CRC) type.

Thus, the messages according to this standard have a size varying from 64 to 1518 bytes, the service information taking up 18 to 26 bytes.

In the messages transmitted between the modules M1, M2, . . . , Mn from the local unit 10, the field 93 normally containing the address of the addressee in the Ethernet messages is actually used to transmit an identification code of the message in order to enable a message to be distributed to several modules. This corresponds to the principle of identification by the contents.

Figure 7:
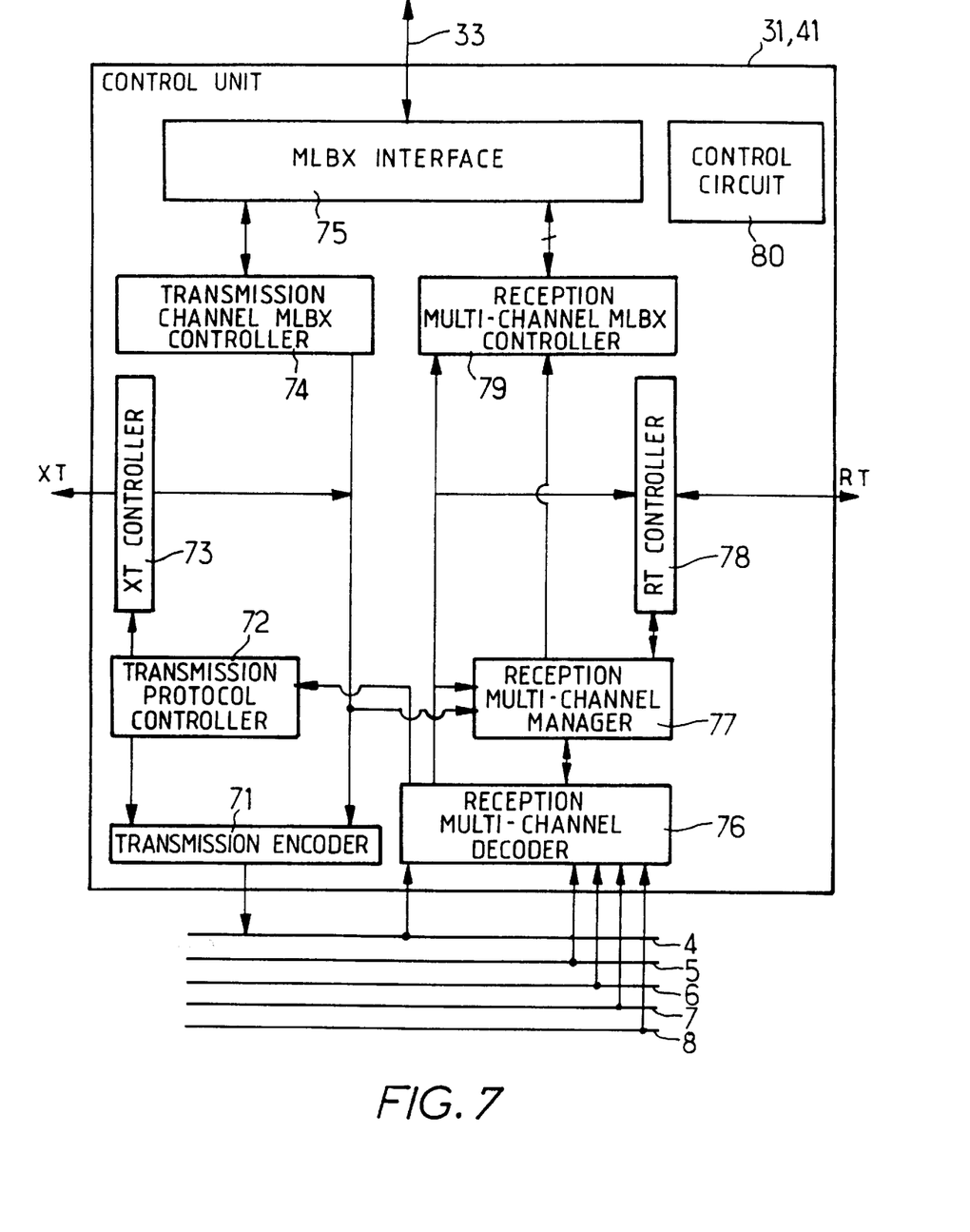
FIG. 7 gives a schematic view of a bus control unit that is placed in the functional modules and the coupling module according to FIGS. 4 and 5.

FIG. 7 shows the bus control unit 31, 41 of the modules M1, MC shown in FIGS. 4 and 5. This control unit comprises the following elements for the transmission of messages on the internal transmission bus, for example 4, assigned to the control unit:

a transmission encoder circuit 71 connected to the internal bus 4 carrying out the formatting, serializing and encoding of the information elements to be transmitted, a transmission protocol control circuit 72 that manages the protocol (temporal format) for taking decisions on the transmission of information elements on the bus and controls the spatial format of the messages in transmission, a control circuit 73 of the transmission non-volatile memory 38, 51 containing the description of the messages to be transmitted, and the address of these messages in the exchange memory 32, 42, this control circuit 73 performing the reading of the description information elements associated with each of the data blocks of a given message to be transmitted, contained in the non-volatile memory 38, 51, and a transmission control circuit 74 of the exchange memory 32, 42 that carries out the management in transmission of an interface circuit 75 for the acquisition and monitoring of the information elements to be transmitted, the interface circuit 75 performing the management of the different requests for access to the exchange memory 32, 42 through the address and data transfer bus 33, 43.

The control unit 31, 41 comprises, for the reception of information travelling through the internal buses 4 to 8:

a multichannel reception decoder circuit 76 designed to detect the activity of each bus or channel, deserialize the information elements received on each of the channels and perform operations of physical and partially logic monitoring, channel by channel, a multichannel reception management circuit 77 that carries out the management and monitoring of the information elements received on each channel as well as the arrangement of the processing operations to be performed for the reception of information elements transmitted by each channel, a circuit 78 for the control of the non-volatile reception memory 37, 50 containing the description of the data blocks to be received and the 5 address of these blocks in the exchange memory 32, 42, this control circuit 78 reading the description information elements associated with a data block received by a channel, contained in the non-volatile memory 37, 50, and a reception control circuit 79 to control the exchange memory 32, 42 that carries out the management in reception of the interface circuit 75 for the supply and monitoring of the information received.

Furthermore, the control unit 31, 41 comprises a control circuit 80 that enables an external entity to configure, monitor and control the different elements of the control unit.

It must be noted that the multichannel reception decoder circuit 76 is also connected to the bus 4 so as to receive the data blocks transmitted by the transmission encoder circuit 71. The information elements to be transmitted used by the transmission encoder circuit 71 are generally given directly to the multichannel reception management circuit 77 so as to enable the quality of transmission to be controlled by the comparison of the data elements transmitted with the data elements received.

A control unit 31, 41 of this kind can advantageously be integrated into an ASIC.

Figure 8:
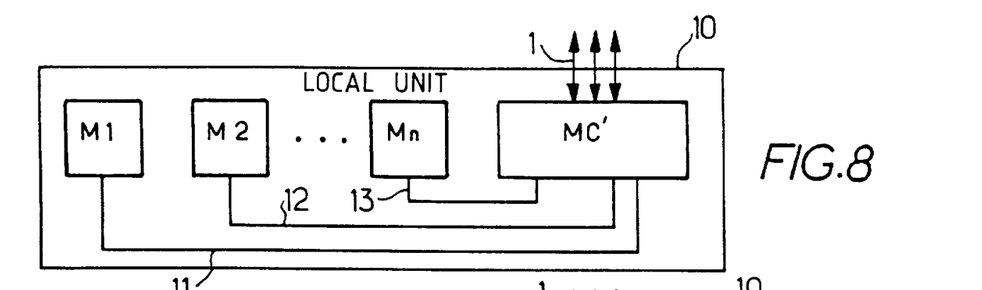
FIGS. 8 to 10 give a schematic view of different modes of interconnection between the functional modules of the local unit according to the second preferred embodiment of the invention.
Figure 9:
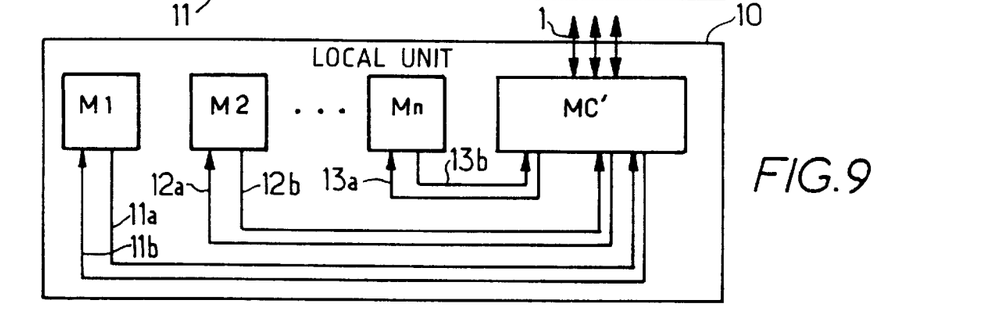
Figure 10:
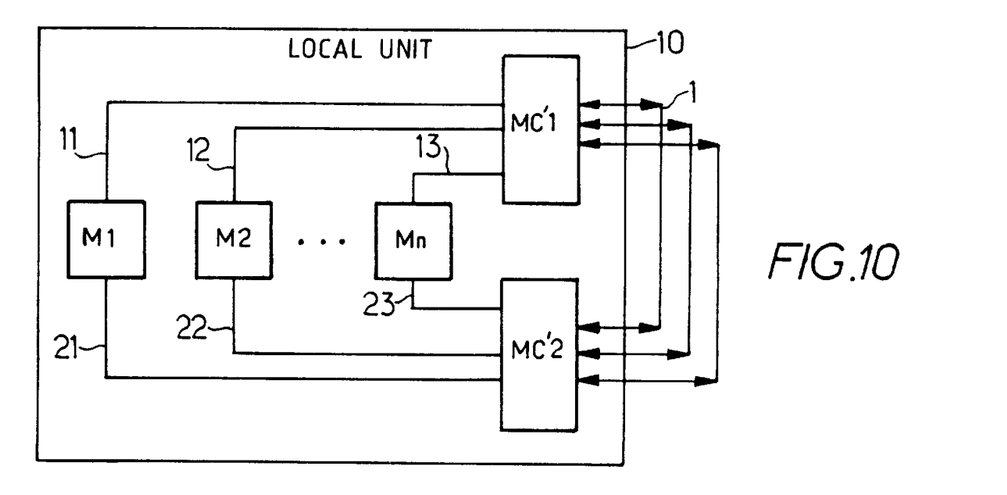

FIGS. 8 to 10 show another example of the connection of the functional modules M1, M2, . . . , Mn of the local unit 10. In this example, the modules M1, M2, . . . , Mn are each connected by a respective two-way link to a coupling module MC', the coupling module providing for communications between modules of the local unit 10 as well as for communications between the modules and the exterior of the local unit 10 which may be connected to one or more external buses 1 or other elements such as sensors or actuators.

In FIG. 8, each module M1, M2, . . . , Mn is connected to the coupling module MC' by a respective Ethernet type bus 11, 12, 13 used in alternate control-response mode (half-duplex mode).

As shown in FIG. 9, the two-way link between each of the modules M1 to Mn and the coupling module MC' may be obtained by two Ethernet buses 11a, 11b, 12a, 12b, 13a, 13b, the first bus being assigned by each module M1 to Mn to the transmission of messages and the second bus being assigned to the reception of messages. Thus, the transmission bit rate placed at the disposal of each module is doubled.

In the case of the architecture shown in FIG. 9, the control units 31' and 41' no longer need to test the activity of the internal bus before making transmission, since each module M1 to Mn and MC' of the local unit makes transmission on a bus where it is the sole transmitter.

It can be seen quite clearly in FIGS. 5 and 9 that the coupling module MC' is the common point of this architecture. To eliminate this drawback, it is possible, as shown in FIG. 10, to use two redundant coupling modules MC'1 and MC'2, each being connected by a respective dedicated bus 11 to 13 and 21 to 23, to each of the modules M1 to Mn. Each functional module must then make a comparison of the messages received by the two buses respectively connected to the two coupling modules MC'1, MC'2. An absence of transmission from a coupling module would reveal a malfunction of this module.

Naturally, the architecture shown in FIGS. 5 and 9 may also be tripled through the use of three coupling modules to enable communications between the functional modules even in the event of the malfunctioning of one of the coupling modules.

In the architecture shown in FIGS. 8 and 10, the transmission on the bus is subjected to the control either of the transmitter when it is a functional module M1 to Mn or of the receiver when the transmitter is the Coupling module MC'. In the latter case, a message is transmitted by the coupling module solely at the request of the functional module to which the message is addressed, this request indicating the message or messages that have to be transmitted.

In this architecture, the latency is reduced to the minimum inasmuch as a request for reception by a module gives rise to the transmission by the coupling module of the corresponding messages.

Should a message have to be broadcast to several modules, this message will be transmitted by the coupling module MC' as many times as there are addressee modules, namely as many times as there are requests from the different receiver modules.

Figure 11:
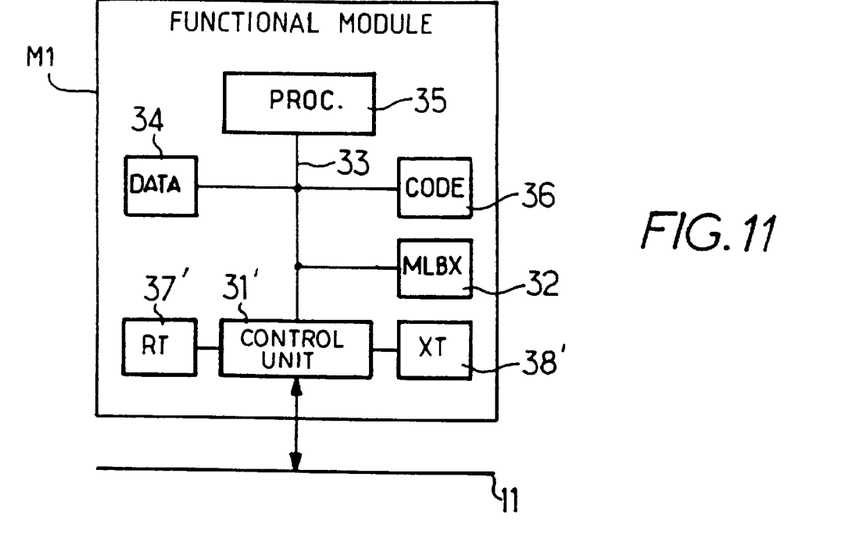
FIG. 11 gives a schematic view of the architecture of a functional module shown in FIGS. 8 to 10.

The functional module M1 shown in FIG. 11 is identical to the module M1 of FIG. 4 apart from the fact that it has a control unit 31' that is simplified (not a multi-receiver), inasmuch as it controls only one internal bus 11 (or two should the coupling module MC' be duplicated by another redundant coupling module), routinely carries out the transfer of messages flowing on this internal bus 11 and does not need to carry out an operation of detection and processing of collision.

Furthermore, the non-volatile memories 37', 38', contain the tables RT, XT respectively describing the characteristics of the message to be received and transmitted. These tables in particular indicate the storage address, in the exchange memory 32, of the messages received or to be transmitted, in association with an identification code of the message as well as other information elements, for example on the type of data elements contained in the message.

It must be noted that, in the case of the module M1 shown in FIG. 11, the control unit 31' has the same architecture as the control unit 31 represented in FIG. 7, except that it is single-channel in reception, thus simplifying the reception decoder circuit 76, the exchange memory controller circuit 79 as well as the reception management circuit 77.

Similarly, the transmission controller 72 may be simplified since it is not necessary to carry out a collision-management operation. The transmission protocol controller 72 then becomes very simple.

Figure 12:
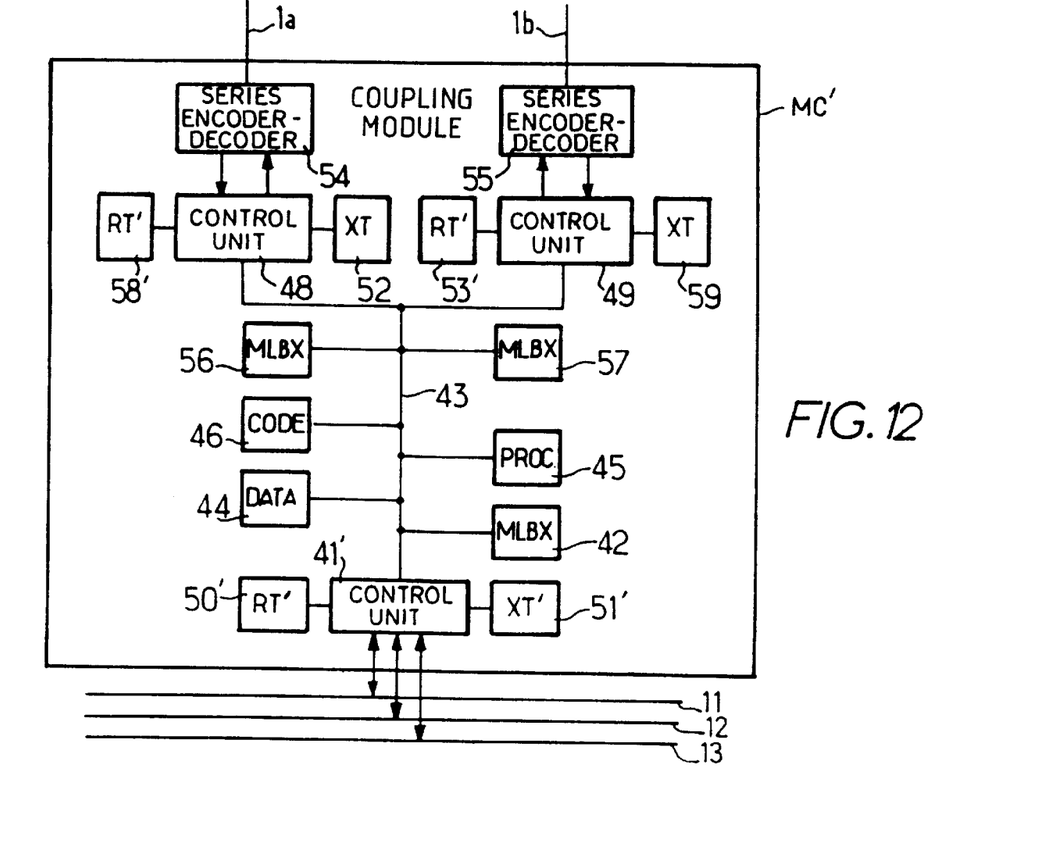
FIG. 12 gives a schematic view of the architecture of the coupling module shown in FIGS. 8 to 10.

The coupling module MC' shown in FIG. 12 resembles that of FIG. 5, apart from the fact that there is no longer any direct link in reception between the external buses 1a, 1b and internal buses of the local unit 10 and that it comprises a control unit 41' for the internal multi-transmitter and multi-receiver buses. This control unit 41' receives all the messages travelling through the internal buses, uses the associated identification code to redirect them, and has no need to detect and process collisions.

In the non-volatile memories 53', 58' tables RT' are stored. These tables RT' contain codes for the identification of the messages transmitted by the buses 1a and 1b which are retransmitted to a module M1 to Mn of the local unit 10, these messages being stored respectively in the exchange memories 56 and 57 at a respective address indicated by the tables 53', 58'.

Similarly, the non-volatile memories 52, 59 contain the addresses of the messages stored in the exchange memories 56, 57 which have to be retransmitted respectively on the external buses 1a, 1b.

The non-volatile memory 51' contains the transmission table Xr on the internal buses 11 to 13. This table XT brings together data elements specific to each module M1 to Mn or local bus 11 to 13. For each bus, it associates each request number liable to be transmitted by the bus with an assembly of data elements constituting the message to be transmitted on the bus 11 to 13 from which the request comes. Each message is described by the identification codes and the storage addresses, in the exchange memories 42, 56, 57, of the data elements forming the message.

The non-volatile memory 50' contains the reception table RT which, for each internal bus 11 to 131 defines the list of storage addresses of the data elements received in the message identified by its request and its bus.

It must be noted that, in the case of the architecture shown in FIG. 9, the control units 31' and 41' no longer need to test the activity of the internal bus before making transmission, given that each module M1 to Mn and MC' of the local unit makes transmission on a bus where it is the sole transmitter.

Figure 13:
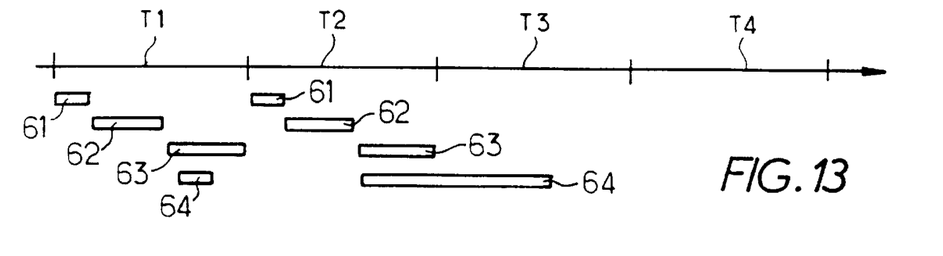
FIG. 13 illustrates the arrangement of the processing operations for the transmission of messages on the internal buses.

FIG. 13 shows an exemplary arrangement of the transmission and reception processing operations performed by the coupling module MC'. The coupling module comprises an analysis loop using a time allocator for the assignment, to each internal bus 11, 12, 13 and external bus 1a, 1b, of a time section T1, T2, T3 with a predefined duration. At the beginning of each section T1, T2, T3 during the period 61, the module MC' tests the presence in the memory 42 of a request coming from a module M1 to Mn connected to the corresponding bus. If such a request is found, the coupling module MC', during the period 62, builds the message to be transmitted in response to the request, by means of the table XT' contained in the memory 51'. If there is no such request, the corresponding section is allocated to the analysis of an external bus.

In general, a request is followed by a request number and a message transmitted by the module M1 to Mn. The coupling module MC' therefore, during the period 63, will carry out the distribution, with a view to their subsequent transmission, of the different data elements of the message received in the exchange memories 42, 56, 57 as a function of the addresses corresponding to the request number, indicated in the table RT' contained in the memory 50'. During the period 64, the control unit 41' of the coupling module MC' carries out the transmission of the data elements of the message corresponding to the request that has just been processed and the coupling module MC', at the beginning of the following time section T2, may begin the processing of the corresponding request.

It must be noted that the transmission of a message may overlap the following time section since, at the end of the period 63, the processor 45 of the coupling module MC' has transferred the data elements into the exchange memory 42 and therefore terminated the processing of the request, the transmission of the message being then taken over by the control unit 41'.

The information elements received by the external buses are identified by their contents, for example by an identification code or by the address of the addressee. This identification code is used by the coupling module MC' to access the table RT' contained in the memories 53', 58'. This table RT' enables the information elements received in the exchange memory 42 to be distributed with a view to their subsequent transmission to one or more modules M1 to Mn.

The information elements to be transmitted on the external buses come from internal transmissions of the modules M1 to Mn, an external transmission taking place only if a message has been transferred into the exchange memory 56, 57 following the reception of a message transmitted by a module.

It is possible to provide for a case where the allocator subdivides the time into a cycle for the processing of periodic requests and a cycle for the processing of aperiodic requests, a predefined temporal section being assigned to the processing of each request. The duration of the periodic cycle therefore corresponds to the total of the periods of the temporal sections assigned to the periodic requests.

Each aperiodic message transmitted by a module M1 to Mn is directly received and stored in the coupling module. This reception gives rise to the positioning of a request for each of the buses on which the received message, indicated in the table XT contained in the memory 51, should be transmitted.

Figure 14:
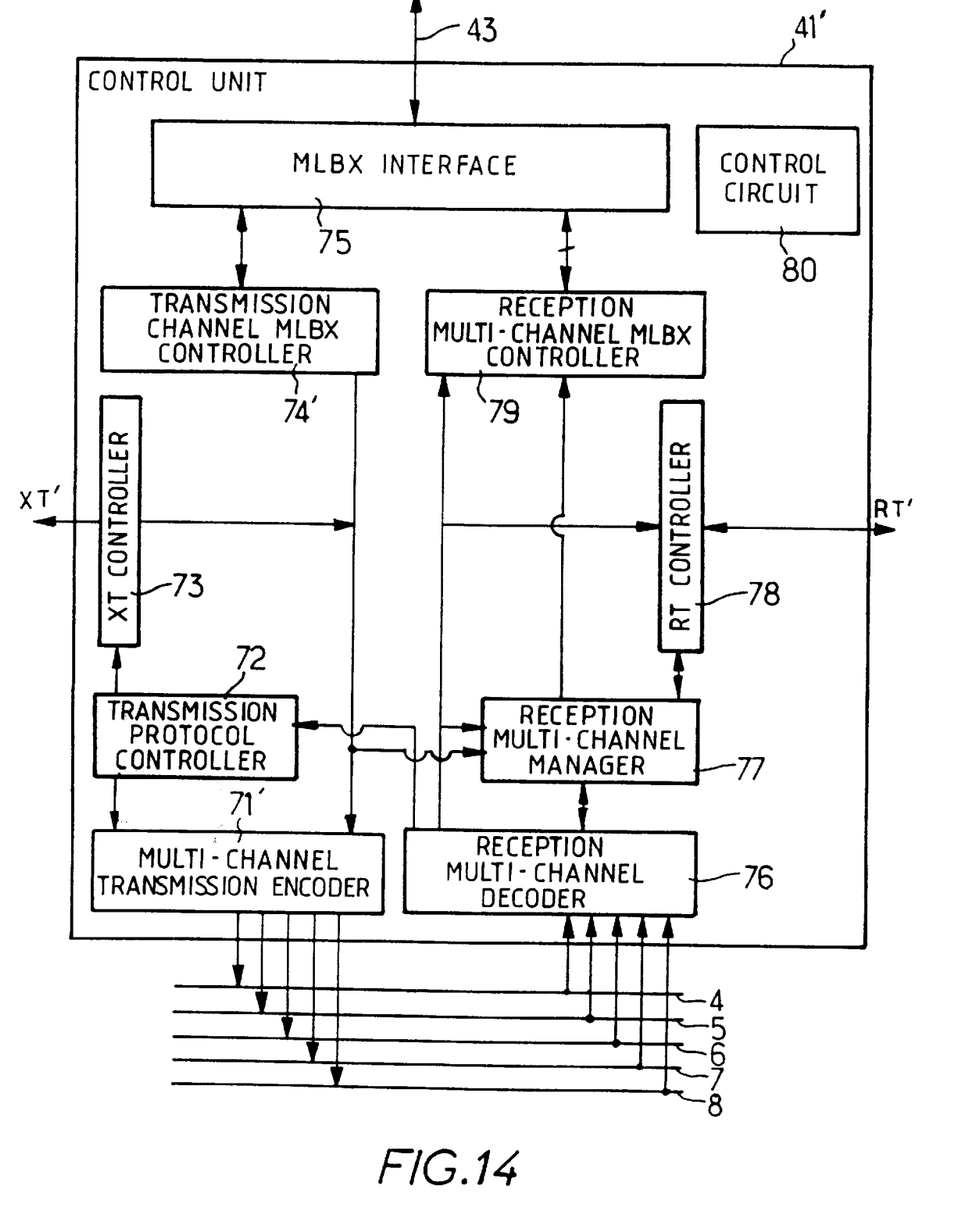
FIG. 14 gives a schematic view of a bus control unit that is placed in the functional modules and the coupling module according to FIGS. 12 and 13.

FIG. 14 shows the control unit 41' of the coupling module MC' shown in FIG. 11. This control unit is similar to the one shown in FIG. 7 apart from the fact that the transmission encoder 71' and the transmission control circuit 74' must also be multichannel circuits since the coupling module is a transmitter and a receiver on all the internal buses 11 to 13 that are connected to it.

What is claimed is:

1. A device for communications between a plurality of functional modules installed in a local unit and at least one Ethernet type external, multiplexed, multi-transmitter and multi-receiving bus to communicate with other local units, wherein said device comprises:
    at least as many internal buses as said plurality of functional modules of the local unit, wherein each internal bus being of the multiplexed, multi-transmitter and multi-receiver type, wherein each of said internal buses complies with a time protocol and a format of data transiting on said Ethernet type external bus and wherein said functional modules are coupled to the internal buses so that access to each one of said internal buses is controlled by a single corresponding one of said functional modules; and
    at least one coupling module designed to provide for the transfer of information elements between the internal buses and the Ethernet external bus.

2. A device according to claim 1, wherein each module of the local unit has at least one internal bus on which it is a sole transmitter, the other modules being receivers only, an additional internal bus being assigned to each external bus for the distribution, inside the local unit, of information elements travelling through the external bus, this distribution bus being of the same type as the internal buses, and being connected to the functional modules and to the coupling module.

3. A device according to claim 2, wherein each functional module comprises means to permit transmission only if all the internal buses of at least one predetermined group of all the internal buses associated with the modules are free.

4. A device according to claim 3, wherein each module comprises means of waiting during a period with a random duration before a new attempt at transmission is made, when a plurality of modules of a predetermined group of said modules attempt to make transmission at the same time.

5. A device according to claim 3, wherein each module is associated with a respective waiting time during which all the internal buses of the predetermined group must remain free before it can make transmission on the internal bus with which it is associated.

6. A device according to claim 5, wherein the transmissions of each module of predetermined group of modules on their associated bus are divided into frames ending in a waiting period of predetermined duration known by all modules of the predetermined group, each module of the predetermined group being permitted to transmit only once per frame.

7. A device according to claim 6, wherein said frames are cyclical, the duration of the cycle being known to all the modules of the predetermined group.

8. A device according to claim 1 or 7, wherein each functional module comprises a control unit connected to each of the internal buses, designed to sort out all the information elements flowing on the internal buses so as to receive only information elements designated for the module, and to transmit information elements on an internal bus controlled by to said module.

9. A device according to claim 8, wherein the control unit is connected to non-volatile memories containing identification and description of the characteristics of the information elements to be received and transmitted, as well as sequencing of the information elements to be transmitted, the control unit comprising means to detect the information elements to be received on the internal buses, and to transfer these information elements into an exchange memory.

10. A device according to claim 8, wherein the control unit comprises means to monitor the internal bus controlled by, to compare information elements transmitted on the bus, during their transmission, with information elements received simultaneously on the bus and to invalidate the transmission of information during transmission and generate an error signal when the comparison reveals a difference.

11. A device according to claim 8, wherein the coupling module comprises means to recognize the information elements, flowing in the internal buses, that have to be sent to the external bus.

12. A device according to claim 8, wherein the coupling module comprises a first control unit connected to the internal buses not connected to the external bus, a first exchange memory that is connected to the control unit, to a processor, to a second exchange memory and to a second control unit similar to the first control unit and carrying out the transfer of the information elements from the second exchange memory to the external bus.

13. A device according to claim 12, wherein the coupling module has an internal bus on which it is sole transmitter, enabling it to send service and maintenance information to the functional modules of the local unit so as to make it possible to provide the functional modules with an indication of defects of information transfer on the external bus, and any malfunctions.

14. A device according to claim 12, wherein the coupling module comprises a serial interface circuit providing for the conversion of an analog signal conveying information on the external bus into a logic signal applied to the internal distribution bus, and conversely to transfer the information elements transmitted by the second control unit to the external bus.

15. A device according to claim 14, wherein the coupling module is connected to a second external bus of the same type as the first external bus and connected to an internal bus by means of a second serial interface circuit, the processor being connected to a third exchange memory and to the second external bus by means of a third control unit and the second serial interface circuit.

16. A device according to claim 1, wherein each internal bus of the local unit sets up a link between a respective module of the local unit and the coupling module.

17. A device according to claim 16, comprising two redundant coupling modules.

18. A device according to claim 1, wherein each internal bus of the local unit establishes a two-way link between a respective module of the local unit and the coupling module.

19. A device according to claim 18, wherein the two-way link between each respective module of the local unit and the coupling module is formed by two multi-transmitter and multi-receiver buses.

20. A device according to one of the claims 16 to 17, wherein the coupling module sends one or more messages to a module solely at the request of this module.

21. A device according to one of the claims 16 to 17, wherein the coupling module assigns each module a pre-defined temporal section during which it processes the requests transmitted by said each module.

22. A device according to one of the claims 16 to 17, wherein the coupling module comprises a table indicating the addresses of distribution of elementary data elements contained in each message received.

23. A device according to claim 22, wherein the coupling module comprises a table indicating the addresses of elementary data elements constituting each message to be transmitted on request.

* * * * *